United States Patent
Ciesla et al.

(10) Patent No.: US 8,243,038 B2
(45) Date of Patent: *Aug. 14, 2012

(54) METHOD FOR ADJUSTING THE USER INTERFACE OF A DEVICE

(75) Inventors: Craig Michael Ciesla, Mountain View, CA (US); Micah B Yairi, Palo Alto, CA (US); Nathaniel Mark Saal, Palo Alto, CA (US)

(73) Assignee: Tactus Technologies, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,426

(22) Filed: Jul. 5, 2010

(65) Prior Publication Data

US 2011/0001613 A1 Jan. 6, 2011

Related U.S. Application Data

(60) Provisional application No. 61/223,003, filed on Jul. 3, 2009, provisional application No. 61/303,214, filed on Feb. 10, 2010.

(51) Int. Cl.
*G06F 3/041* (2006.01)
*G08B 6/00* (2006.01)
*G09B 21/00* (2006.01)

(52) U.S. Cl. .............. 345/173; 178/18.01; 434/114; 340/407.2

(58) Field of Classification Search .......... 345/173–179, 345/168–169, 104, 172; 463/37–38; 455/466; 178/18.01–20.02; 434/112–117; 340/407.1–407.2
See application file for complete search history.

(56) References Cited

U.S. PATENT DOCUMENTS

| 3,659,354 | A | * | 5/1972 | Sutherland ................. 434/113 |
| 3,818,487 | A | * | 6/1974 | Brody et al. ............. 340/407.1 |
| 4,109,118 | A |   | 8/1978 | Kley |
| 4,209,819 | A |   | 6/1980 | Seignemartin |
| 4,307,268 | A |   | 12/1981 | Harper |
| 4,467,321 | A | * | 8/1984 | Volnak ........................ 341/23 |
| 4,477,700 | A |   | 10/1984 | Balash et al. |

(Continued)

FOREIGN PATENT DOCUMENTS

WO 2008037275 A1 4/2008

OTHER PUBLICATIONS

Optical Society of America, Optics Express; vol. 12, No. 11. May 31, 2004, 7 Pages, Jeong, Ki-Hun , et al. "Tunable Microdoublet Lens Array".

(Continued)

*Primary Examiner* — Bipin Shalwala
*Assistant Examiner* — Patrick F Marinelli
(74) *Attorney, Agent, or Firm* — Jeffrey Schox

(57) ABSTRACT

A method adjusting a user interface experience for a device that includes providing a user interface to retrieve a user input, providing a tactile interface layer that defines a surface and includes a volume of fluid and a displacement device 10 that manipulates the volume of fluid to deform a particular region of the surface into a tactilely distinguishable formation retrieving a user preference between a first type, location, and/or timing and a second embodiment, location, and/or timing through the user interface, and manipulating the volume of fluid to deform a particular region of the surface into a tactilely distinguishable formation of one of the first and second type, location, and/or timing is disclosed.

28 Claims, 9 Drawing Sheets

U.S. PATENT DOCUMENTS

| | | | |
|---|---|---|---|
| 4,517,421 A | 5/1985 | Margolin | |
| 4,920,343 A * | 4/1990 | Schwartz | 341/33 |
| 5,194,852 A | 3/1993 | More et al. | |
| 5,195,659 A * | 3/1993 | Eiskant | 222/102 |
| 5,222,895 A * | 6/1993 | Fricke | 434/113 |
| 5,286,199 A * | 2/1994 | Kipke | 434/114 |
| 5,369,228 A * | 11/1994 | Faust | 178/18.05 |
| 5,412,189 A | 5/1995 | Cragun | |
| 5,496,174 A * | 3/1996 | Garner | 434/114 |
| 5,742,241 A | 4/1998 | Crowley et al. | |
| 5,754,023 A | 5/1998 | Roston et al. | |
| 5,766,013 A * | 6/1998 | Vuyk | 434/114 |
| 5,835,080 A | 11/1998 | Beeteson et al. | |
| 5,917,906 A * | 6/1999 | Thornton | 379/433.07 |
| 5,943,043 A | 8/1999 | Furuhata et al. | |
| 5,977,867 A | 11/1999 | Blouin | |
| 5,982,304 A | 11/1999 | Selker et al. | |
| 6,218,966 B1 | 4/2001 | Goodwin et al. | |
| 6,310,614 B1 * | 10/2001 | Maeda et al. | 345/173 |
| 6,356,259 B1 | 3/2002 | Maeda et al. | |
| 6,384,743 B1 * | 5/2002 | Vanderheiden | 341/21 |
| 6,462,294 B2 | 10/2002 | Davidson et al. | |
| 6,498,353 B2 | 12/2002 | Nagle et al. | |
| 6,501,462 B1 * | 12/2002 | Garner | 345/173 |
| 6,636,202 B2 * | 10/2003 | Ishmael et al. | 345/173 |
| 6,655,788 B1 | 12/2003 | Freeman | |
| 6,657,614 B1 * | 12/2003 | Ito et al. | 345/168 |
| 6,667,738 B2 * | 12/2003 | Murphy | 345/173 |
| 6,700,556 B2 | 3/2004 | Richley et al. | |
| 6,703,924 B2 | 3/2004 | Tecu et al. | |
| 6,743,021 B2 * | 6/2004 | Prince et al. | 434/113 |
| 6,819,316 B2 | 11/2004 | Schulz et al. | |
| 6,861,961 B2 | 3/2005 | Sandbach et al. | |
| 6,877,986 B2 * | 4/2005 | Fournier et al. | 434/112 |
| 6,881,063 B2 * | 4/2005 | Yang | 434/114 |
| 6,930,234 B2 | 8/2005 | Davis | |
| 7,064,655 B2 | 6/2006 | Murray et al. | |
| 7,081,888 B2 * | 7/2006 | Cok et al. | 345/173 |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,131,073 B2 | 10/2006 | Rosenberg et al. | |
| 7,136,045 B2 | 11/2006 | Rosenberg et al. | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,233,313 B2 | 6/2007 | Levin et al. | |
| 7,233,315 B2 | 6/2007 | Gregorio et al. | |
| 7,233,476 B2 | 6/2007 | Goldenberg et al. | |
| 7,236,157 B2 | 6/2007 | Schena et al. | |
| 7,245,202 B2 | 7/2007 | Levin | |
| 7,245,292 B1 * | 7/2007 | Custy | 345/173 |
| 7,249,951 B2 | 7/2007 | Bevirt et al. | |
| 7,250,128 B2 * | 7/2007 | Unger et al. | 264/155 |
| 7,253,803 B2 | 8/2007 | Schena et al. | |
| 7,265,750 B2 | 9/2007 | Rosenberg | |
| 7,280,095 B2 | 10/2007 | Grant | |
| 7,283,120 B2 | 10/2007 | Grant | |
| 7,283,123 B2 | 10/2007 | Braun et al. | |
| 7,289,106 B2 | 10/2007 | Bailey et al. | |
| 7,307,619 B2 | 12/2007 | Cunningham et al. | |
| 7,308,831 B2 | 12/2007 | Cunningham et al. | |
| 7,319,374 B2 | 1/2008 | Shahoian | |
| 7,336,260 B2 | 2/2008 | Martin et al. | |
| 7,336,266 B2 | 2/2008 | Hayward et al. | |
| 7,339,572 B2 | 3/2008 | Schena | |
| 7,342,573 B2 | 3/2008 | Ryynanen | |
| 7,369,115 B2 | 5/2008 | Cruz-Hernandez et al. | |
| 7,382,357 B2 | 6/2008 | Panotopoulos et al. | |
| 7,397,466 B2 * | 7/2008 | Bourdelais et al. | 345/173 |
| 7,432,910 B2 | 10/2008 | Shahoian | |
| 7,432,911 B2 | 10/2008 | Skarine | |
| 7,432,912 B2 * | 10/2008 | Cote et al. | 345/169 |
| 7,433,719 B2 | 10/2008 | Dabov | |
| 7,471,280 B2 * | 12/2008 | Prins | 345/156 |
| 7,522,152 B2 | 4/2009 | Olien et al. | |
| 7,545,289 B2 | 6/2009 | Mackey et al. | |
| 7,548,232 B2 | 6/2009 | Shahoian et al. | |
| 7,567,232 B2 | 7/2009 | Rosenberg | |
| 7,567,243 B2 | 7/2009 | Hayward | |
| 7,589,714 B2 | 9/2009 | Funaki | |
| 7,659,885 B2 * | 2/2010 | Kraus et al. | 345/168 |
| 7,920,131 B2 * | 4/2011 | Westerman | 345/173 |
| 7,978,181 B2 * | 7/2011 | Westerman | 345/173 |
| 7,989,181 B2 * | 8/2011 | Blattner et al. | 435/69.1 |
| 2001/0043189 A1 * | 11/2001 | Brisebois et al. | 345/156 |
| 2002/0110237 A1 | 8/2002 | Krishnan | |
| 2003/0087698 A1 | 5/2003 | Nishiumi et al. | 463/36 |
| 2003/0179190 A1 * | 9/2003 | Franzen | 345/173 |
| 2004/0164968 A1 * | 8/2004 | Miyamoto | 345/173 |
| 2005/0007339 A1 * | 1/2005 | Sato | 345/156 |
| 2005/0007349 A1 | 1/2005 | Vakil et al. | |
| 2005/0030292 A1 * | 2/2005 | Diederiks | 345/173 |
| 2005/0057528 A1 * | 3/2005 | Kleen | 345/173 |
| 2005/0088417 A1 * | 4/2005 | Mulligan | 345/173 |
| 2005/0162408 A1 * | 7/2005 | Martchovsky | 345/173 |
| 2005/0231489 A1 | 10/2005 | Ladouceur et al. | |
| 2005/0285846 A1 * | 12/2005 | Funaki | 345/173 |
| 2006/0098148 A1 * | 5/2006 | Kobayashi et al. | 349/130 |
| 2006/0118610 A1 | 6/2006 | Pihlaja et al. | |
| 2006/0119586 A1 * | 6/2006 | Grant et al. | 345/173 |
| 2006/0214923 A1 * | 9/2006 | Chiu et al. | 345/173 |
| 2006/0238510 A1 * | 10/2006 | Panotopoulos et al. | 345/168 |
| 2006/0256075 A1 | 11/2006 | Anastas et al. | |
| 2006/0278444 A1 * | 12/2006 | Binstead | 178/18.06 |
| 2007/0013662 A1 | 1/2007 | Fauth | |
| 2007/0085837 A1 * | 4/2007 | Ricks et al. | 345/173 |
| 2007/0122314 A1 * | 5/2007 | Strand et al. | 422/100 |
| 2007/0165004 A1 * | 7/2007 | Seelhammer et al. | 345/173 |
| 2007/0171210 A1 | 7/2007 | Chaudhri et al. | |
| 2007/0182718 A1 * | 8/2007 | Schoener et al. | 345/173 |
| 2007/0236466 A1 | 10/2007 | Hotelling | |
| 2007/0247429 A1 | 10/2007 | Westerman | |
| 2007/0254411 A1 * | 11/2007 | Uhland et al. | 438/127 |
| 2007/0257634 A1 | 11/2007 | Leschin et al. | |
| 2007/0273561 A1 | 11/2007 | Philipp | |
| 2007/0296702 A1 | 12/2007 | Strawn et al. | |
| 2008/0010593 A1 | 1/2008 | Uusitalo et al. | |
| 2008/0136791 A1 | 6/2008 | Nissar | |
| 2008/0143693 A1 | 6/2008 | Schena | |
| 2008/0150911 A1 | 6/2008 | Harrison | |
| 2008/0174570 A1 * | 7/2008 | Jobs et al. | 345/173 |
| 2008/0202251 A1 * | 8/2008 | Serban et al. | 73/780 |
| 2008/0238448 A1 * | 10/2008 | Moore et al. | 324/686 |
| 2008/0252607 A1 * | 10/2008 | De Jong et al. | 345/173 |
| 2008/0266264 A1 * | 10/2008 | Lipponen et al. | 345/169 |
| 2008/0286447 A1 * | 11/2008 | Alden et al. | 427/108 |

| | | | | |
|---|---|---|---|---|
| 2008/0291169 A1* | 11/2008 | Brenner et al. ............... 345/168 |
| 2008/0297475 A1* | 12/2008 | Woolf et al. ................. 345/163 |
| 2008/0303796 A1 | 12/2008 | Fyke |
| 2009/0002140 A1* | 1/2009 | Higa ........................... 340/407.1 |
| 2009/0002205 A1* | 1/2009 | Klinghult et al. ............... 341/33 |
| 2009/0002328 A1* | 1/2009 | Ullrich et al. ................ 345/173 |
| 2009/0009480 A1 | 1/2009 | Heringslack |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma |
| 2009/0115734 A1 | 5/2009 | Fredriksson et al. |
| 2009/0128503 A1* | 5/2009 | Grant et al. .................. 345/173 |
| 2009/0135145 A1 | 5/2009 | Chen et al. |
| 2009/0140989 A1 | 6/2009 | Ahlgren |
| 2009/0167508 A1 | 7/2009 | Fadell et al. |
| 2009/0167509 A1 | 7/2009 | Fadell et al. |
| 2009/0167677 A1 | 7/2009 | Druse et al. |
| 2009/0167704 A1 | 7/2009 | Terlizzi et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2010/0103116 A1* | 4/2010 | Leung et al. .................. 345/173 |
| 2010/0295820 A1 | 11/2010 | Kikin-Gil |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".

* cited by examiner

METHOD FOR ADJUSTING THE USER INTERFACE OF A DEVICE

CROSS-REFERENCE TO RELATED APPLICATIONS

This application claims the benefit of U.S. Provisional Application No. 61/223,003 filed on 3 Jul. 2009, and 61/303,214 filed on 10 Feb. 2010, which are both incorporated in their entirety by this reference.

This application is related to U.S. application Ser. No. 11/969,848 filed on 4 Jan. 2008 and entitled "System and Method for Raised Touch Screens", and U.S. application Ser. No. 12/319,334 filed on 5 Jan. 2009 and entitled "User Interface System", which are both incorporated in their entirety by this reference.

TECHNICAL FIELD

This invention relates generally to touch sensitive user interfaces, and more specifically to a new and useful mountable systems and methods for selectively raising portions of touch sensitive displays.

BACKGROUND

The user interface system of U.S. application Ser. Nos. 11/969,848 and 12/319,334 is preferably used as the user interface for an electronic device, more specifically, in an electronic device that benefits from an adaptive user interface. The user interface system functions to provide a tactile guide and/or feedback to the user. Because of the variety of devices and uses that the user interface system may be used for, for example, an automotive console, a tablet computer, a smartphone, a personal navigation device, a personal media player, a watch, a remote control, a trackpad, or a keyboard, the user interface system must accommodate to each application to provide the user with the kind of tactile guide and/or feedback that facilitates the user in the operation of the device 10. In addition, each user may have a different preference for the kind of tactile guide and/or feedback that is most useful to them in facilitating the operation of the device. For example, while some users may prefer a larger surface area of tactile guidance, others may prefer a larger degree of deformation of the surface area of tactile guidance. Because of the large range of usage scenarios, determining an average user interface system setting that may accommodate to a relatively large range of user preferences for each usage scenario requires a substantial amount of time and research. In addition, because of the large range of user preferences, configuring one set of settings for each use scenario may not provide a user with their preferred tactile guidance and/or feedback. This invention allows the user to adjust the characteristics of the user interface system in order to allow the user interface system to efficiently accommodate to both the usage scenario and the user in a large range of devices and usage scenarios.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
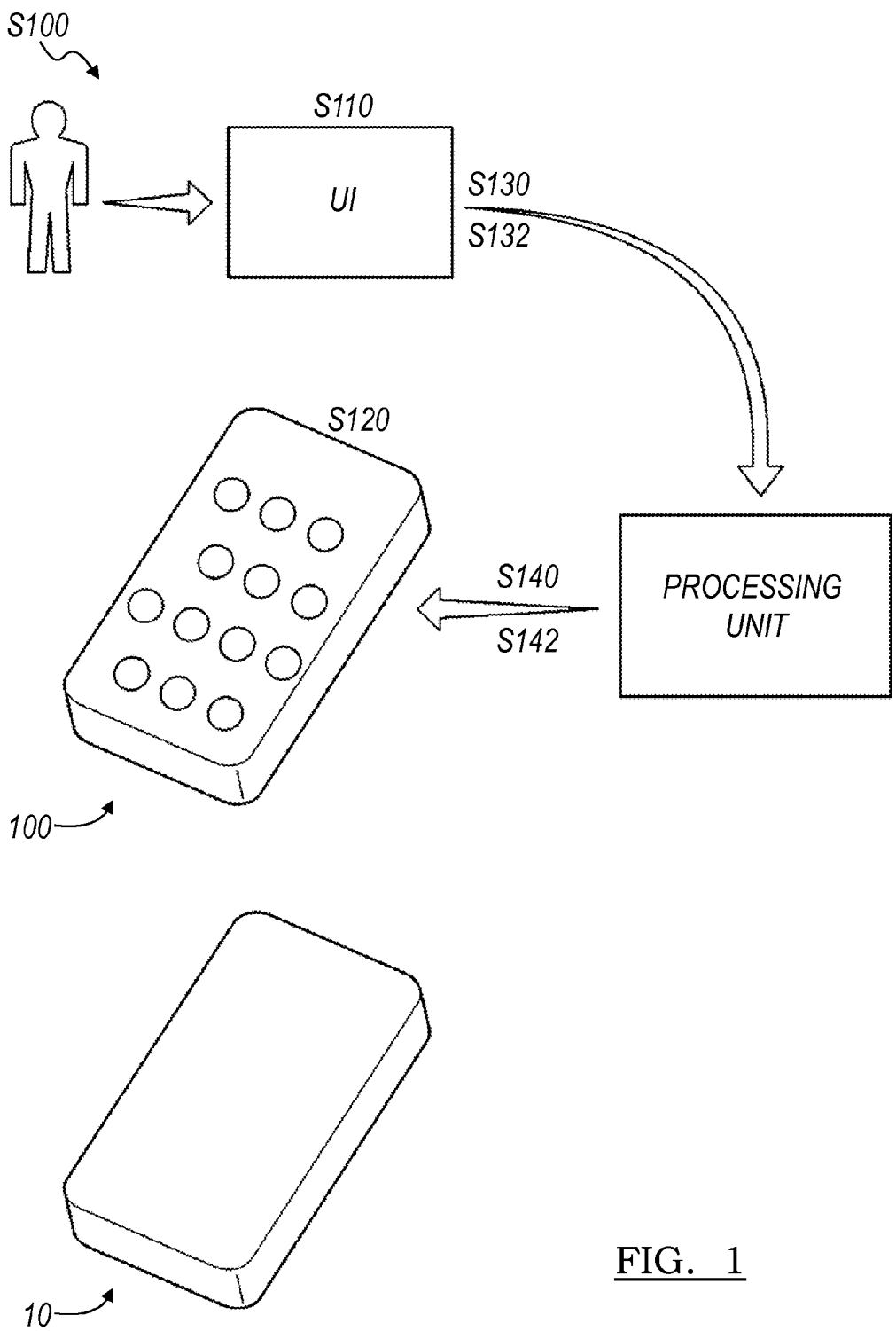
FIGS. 1 and 2 are a first and second variation of the method of the preferred embodiments, respectively.
Figure 2:
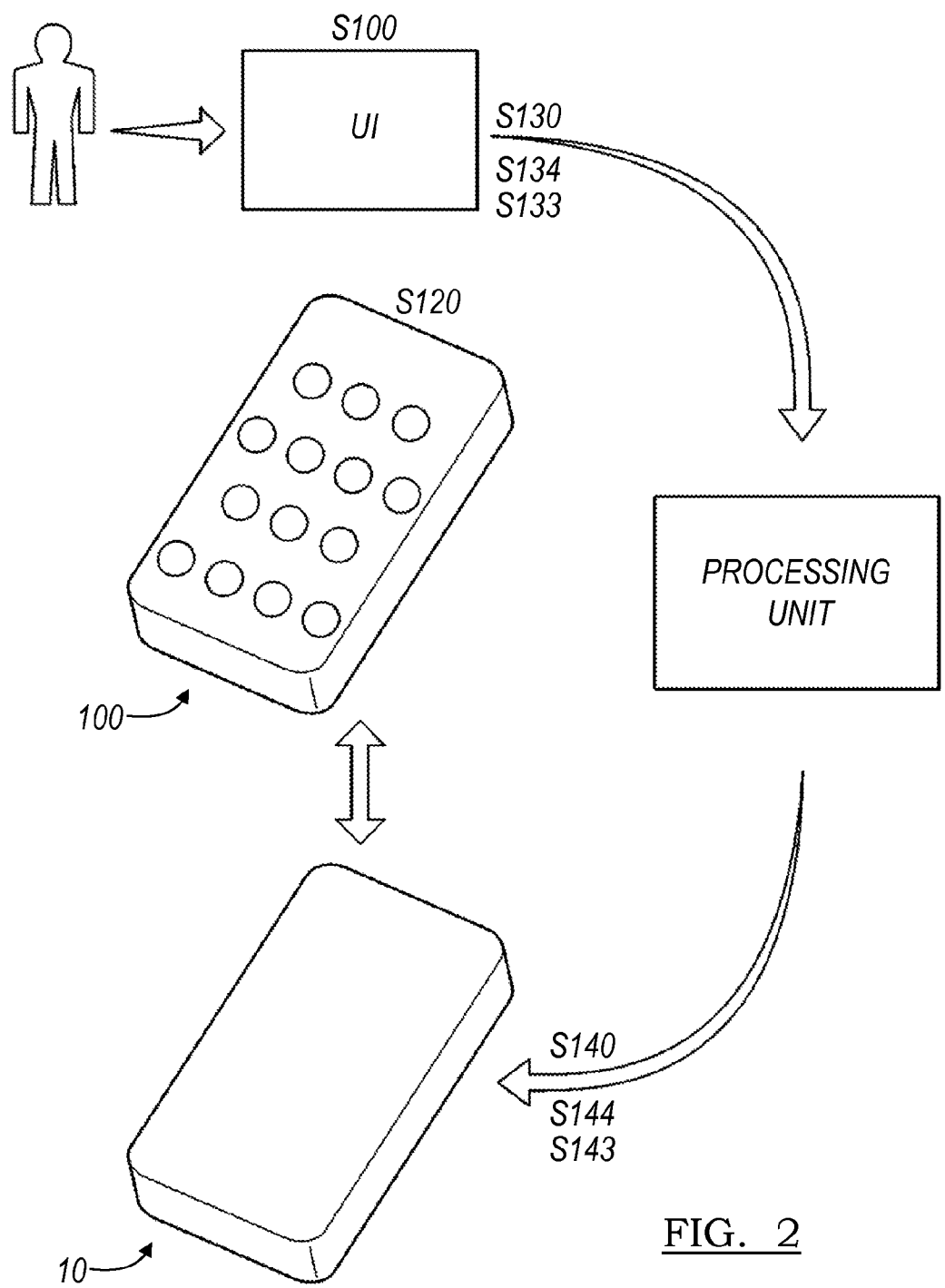

As shown in FIGS. 1 and 2, the method S100 of the preferred embodiments for adjusting a user interface for a device preferably includes providing a user interface to retrieve a user input Step S110, providing a tactile interface layer that defines a surface and includes a volume of fluid and a displacement device that manipulates the volume of fluid to deform a particular region of the surface into a tactilely distinguishable formation Step S120, retrieving a user preference between a first choice of type, location, and/or timing and a second choice of kind, location, and/or timing through the user interface Step S130, and manipulating the volume of fluid to deform a particular region of the surface into a tactilely distinguishable formation of the chosen type, location, and/or timing Step S140. The tactile interface layer may also include a sensor that detects a user input at the tactilely distinguishable formation. In this variation, the step of retrieving a user preference S130 may also include retrieving a user preference between a first sensitivity and a second sensitivity for the sensor through the user interface and the step of manipulating the volume of fluid to deform a particular region of the surface Step S140 may include manipulating the volume of fluid to deform a particular region of the surface into one of a first embodiment of tactilely distinguishable formation for the first sensitivity for the sensor and a second embodiment of tactilely distinguishable formation for the second sensitivity of the sensor based on the user preference. The step of providing a user interface to retrieve a user input S110 may include providing a user interface to retrieve a user input on the device, providing a user interface to retrieve a user input on the tactile interface layer, providing a user interface to retrieve a user input that is on both the device 10 and the tactile interface layer, providing a user interface on a remote control for the device 10 (for example, a wireless remote control), or providing a user interface in any other suitable arrangement.

1. Providing a Tactile Interface Layer

Figure 3:
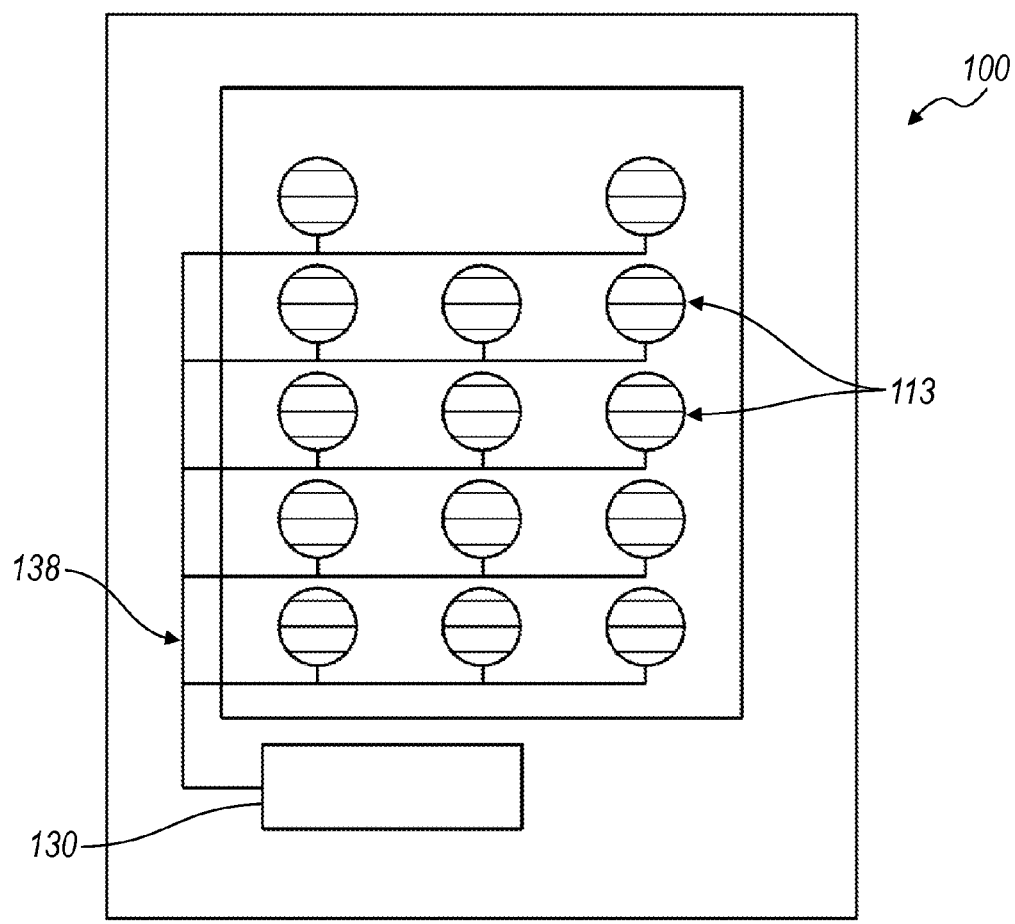
FIG. 3 is a top view of the user interface system of a preferred embodiment.
Figure 4A:
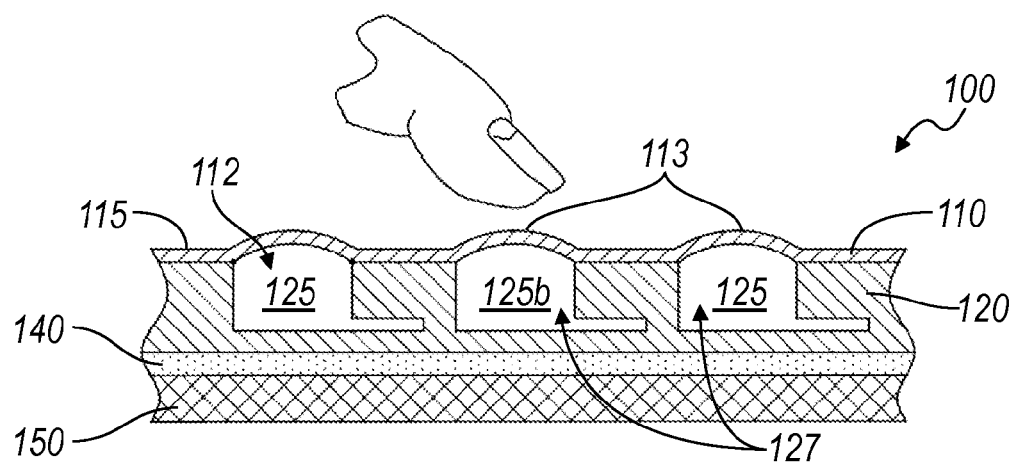
FIGS. 4a and 4b are cross-sectional views of the tactile interface layer of a first and second variation, respectively.
Figure 4B:
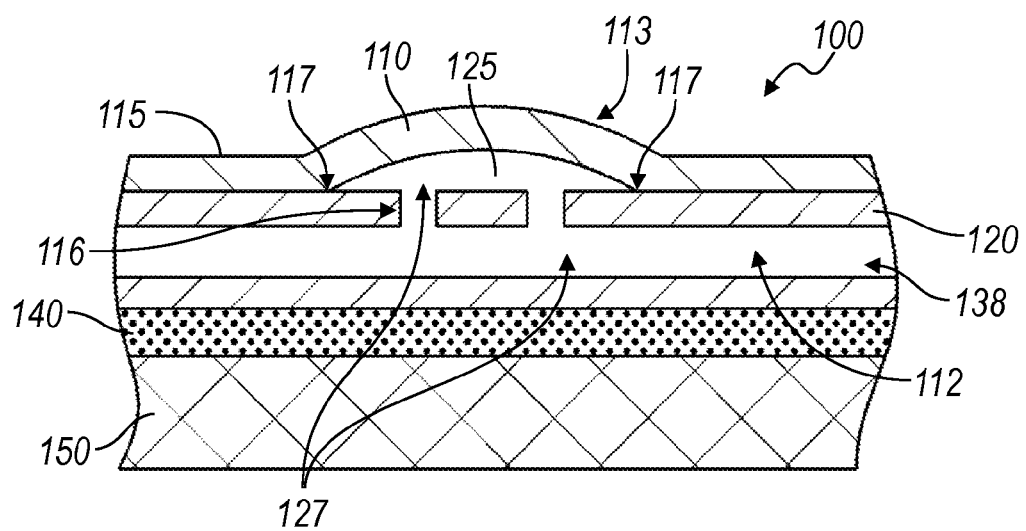

As shown in FIGS. 3 and 4, the tactile interface layer too provided in Step S120 of the preferred embodiment includes: a layer 110 defining a surface 115, a substrate 120 supporting the layer 110 and at least partially defining a fluid vessel 127, and a displacement device 130 coupled to the fluid vessel 127 that influences the volume of fluid 112 within the fluid vessel 127 to expand and retract at least a portion of the fluid vessel 127, thereby deforming a particular region 113 of the surface 115. The surface 115 is preferably continuous, such that when swiping a finger across the surface 115 a user would not feel any substantial seams or any other type of interruption in the surface 115. Alternatively, the surface 115 may include features that facilitate the user in distinguishing one region from another. The surface 115 is also preferably planar. The surface 115 is preferably arranged in a flat plane, but may alternatively be arranged in a curved plane or on a first plane and then wrapped around to a second plane substantially perpendicular to the first plane, or any other suitable arrangement. The surface 115 may alternatively include lumps, bumps, depressions, textures, or may be a surface of any other suitable type or geometry. The fluid vessel 127 preferably includes a cavity 125 and the displacement device 130 preferably influences the volume of fluid 112 within the cavity 125 to expand and retract the cavity 125. The fluid vessel 127 may alternatively be a channel 138 or a combination of a channel 138 and a cavity 125, as shown in FIG. 4b. As shown in the variation shown in FIG. 4b, the substrate 120 preferably defines a fluid outlet 116 that allows fluid to flow between the channel 138 and the cavity 125 to deform and un-deform a particular region of the surface 113. The fluid outlet may be formed into the substrate, for example, the fluid outlet 116 may be a series of bores that are machined into the substrate in between the channel 138 and the cavity 125 as shown in FIG. 4b or an open orifice between the cavity 125 and the channel 138 as shown in FIG. 4a, but may alternatively be a property of the material, for example, the substrate 120 may include a porous material that includes a series of interconnected cavities that allow fluid to flow through the substrate 120. The substrate 120 may define any suitable number of fluid outlets 116 that are of any suitable size and shape. The tactile interface layer may also include a fluid outlet layer (not shown) that defines the fluid outlets 116 that is separate from substrate 120 and arranged in between the substrate 120 and layer 110. However, any other suitable arrangement of the fluid outlets 116 may be used. As shown in FIG. 4b, the portion of the substrate 120 (or the fluid outlet layer) that includes the fluid outlets 116 may also function to provide a support for the layer 110 to substantially prevent the layer no from substantially depressing into the channel 138 when force is applied over the particular region 113. However, the substrate 120 may be arranged in any other suitable manner and may provide support for the layer 110 in any other suitable way.

The layer 110 is preferably attached to the substrate 120 (or fluid outlet layer) at an attachment point 117 that at least partially defines the size and/or shape of the particular region 113. In other words, the attachment point 117 functions to define a border between a deformable particular region of the surface 113 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, chemical bonding, surface activation, welding, or any other suitable attachment material and/or method. The method and material used to form the attachment point 117 is preferably of a similar optical property as the layer 110 and the substrate 120, but may alternatively be of any other optical property. Other portions of the layer 110 and substrate 120 not corresponding to a particular region of the surface 113 may also be adhered using similar or identical materials and methods to the attachment point 117. Alternatively, the layer no and substrate 120 may be left unattached in other portions not corresponding to a particular region of the surface 113. However, the layer no and the substrate 120 may be arranged in any other suitable manner.

The fluid vessel 127 may also include a second cavity 125b. When the second cavity 125b is expanded, a second particular region 113 on the surface 115 is preferably deformed. The displacement device 130 preferably influences the volume of fluid 112 within the second cavity 125b independently of the cavity 125, but may alternatively influence the volumes of fluid 112 within both cavity and second cavity 125 and 125b substantially concurrently. Alternatively, the user interface enhancement system 100 may include a second displacement device 130 that functions to influence the volume of fluid 112 within the second cavity 125b to expand and retract the second cavity 125b, thereby deforming a second particular region 113 of the surface. The second cavity 125b is preferably similar or identical to the cavity 125, but may alternatively be any other suitable kind of cavity. The following examples may be described as expanding a fluid vessel 127 that includes a cavity 125 and a channel 138, but the fluid vessel 127 may be any other suitable combination of combination of cavity 125 and/or channel 138. The tactile interface layer too may also include a display 150 coupled to the substrate 120 and adapted to output images to the user. As described above, the tactile interface layer 100 may also include a sensor 140 that functions to detect inputs from the user. The sensor 140 may be a capacitive sensor, a pressure sensor, a touch sensitive display, or any other suitable sensor type that detects the presence of a user input. The sensor 140 may be located within the fluid vessel 127, substantially adjacent to the fluid vessel 127 (as shown in FIGS. 4a and 4b), remote from the fluid vessel 127, remote from a cavity 125 but fluidly coupled to the fluid vessel 127, or in any other suitable location.

The tactile interface layer 100 of the preferred embodiments has been specifically designed to be used as the user interface for an electronic device 10, more preferably in an electronic device 10 that benefits from an adaptive user interface. The electronic device 10 may or may not include a display and/or a touch sensor, for example, an automotive console, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device 10 that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device 10 and presented to the user as one unit. Alternatively, the tactile interface layer 100 may function as an accessory to a device 10, the user may be presented the tactile interface layer 100 and the device 10 as two separate units wherein, when coupled to each other, the tactile interface layer 100 functions to provide tactile guidance to the user and/or to receive user inputs. However, any other suitable arrangement of the tactile interface layer 100 may be used.

Figure 5A:
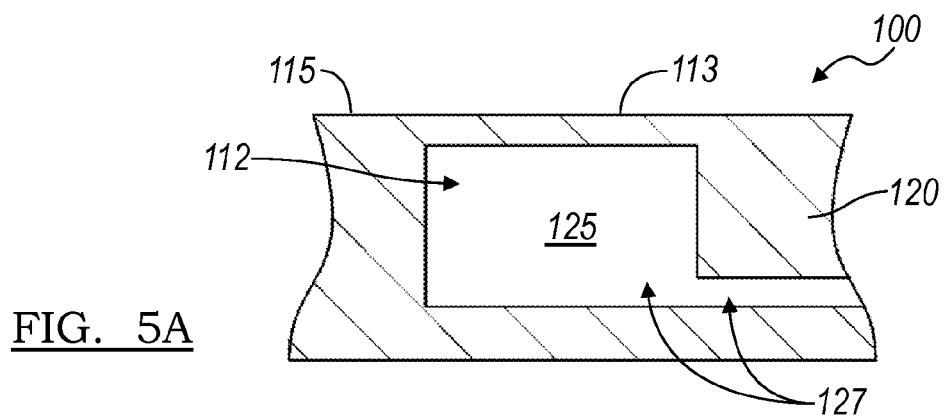
FIGS. 5a, 5b, and 5c are cross-sectional views illustrating the operation of a particular region of the surface of the tactile interface layer in accordance to the preferred embodiments.
Figure 5B:
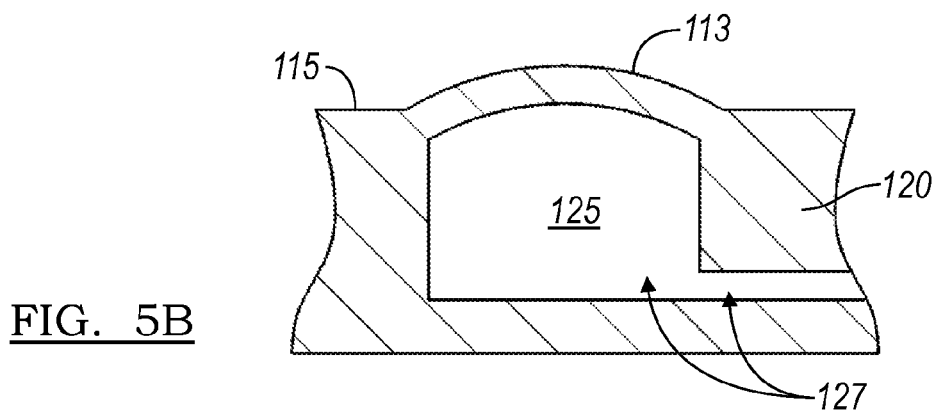
Figure 5C:
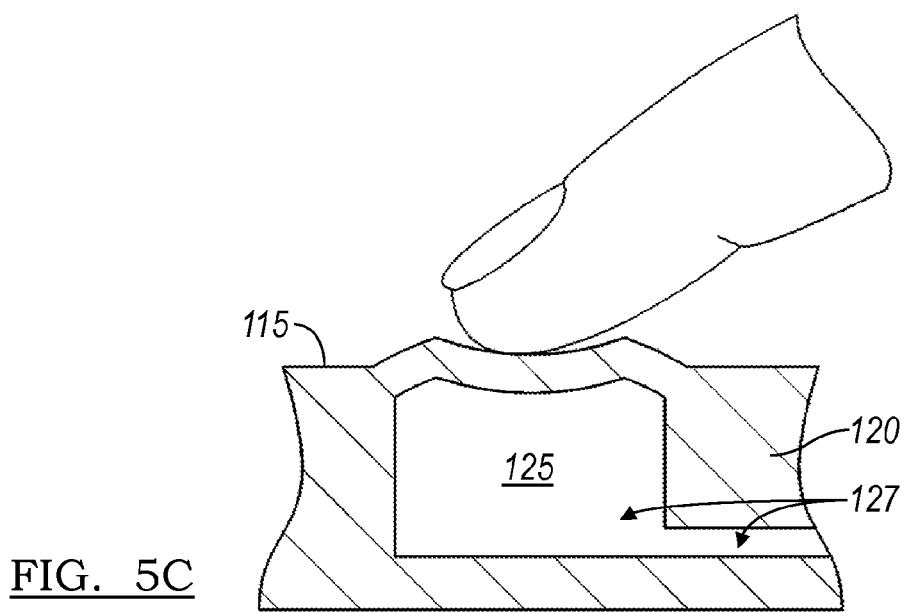

As shown in FIG. 5, the surface 115 of the tactile interface layer 100 preferably remains flat until tactile guidance is to be provided to the user at the location of the particular region 113. The displacement device 130 then preferably expands the cavity 125 to expand the particular region 113 outward, forming a deformation that may be felt by a user, and providing tactile guidance for the user. The expanded particular region 113 preferably also provides tactile feedback to the user when he or she applies force onto the particular region 113 to provide input. Alternatively, the displacement device 130 may retract the cavity 125 to deform the particular region 113 inward. However, any other suitable deformation of the particular region 113 may be used.

As shown in FIG. 5, the cavity 125 of the fluid vessel 127 of the preferred embodiment functions to hold a volume of fluid 112 and to have at least two volumetric settings: a retracted volume setting (shown in FIG. 5a) and an extended volume setting (shown in FIG. 5b). The fluid 112 is preferably a substantially incompressible fluid, but may alternatively be a compressible fluid. The fluid 112 is preferably a liquid (such as water, oil, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 deforms the particular region 113 of the surface 115 above the plane of the other regions of the surface 115. When used with a mobile phone device, the deformation of the particular region 113 preferably has a diameter of 2-10 mm and the cavity 125 may be of a substantially equal diameter as the deformation of the particular region 113 or may be of a smaller or larger diameter. When used with this or other applications, however, the cavity 125 may have any suitable dimension.

The displacement device 130 of the preferred embodiment functions to influence the volume of the fluid 112 with the fluid vessel 127 to expand and retract at least a portion of the fluid vessel 127, thereby deforming a particular region 113 (and/or a second particular region 113) of the surface 115. When used with a mobile phone device, the displacement device 130 preferably increases the volume of the fluid 112 within the fluid vessel 127 by approximately 0.003-0.1 ml to expand the cavity 125 to outwardly deform a particular region 113. When used with this or other applications, however, the volume of the fluid may be increased (or possibly decreased) by any suitable amount. The displacement device 130 preferably modifies the volume of the fluid 112 by (1) modifying the volume of the existing fluid 112 in the fluid vessel 127, or (2) adding and removing fluid 112 to and from the fluid vessel 127. The displacement device 130 may, however, influence the volume of the fluid 112 by any suitable device or method. Modifying the volume of the existing fluid 112 in the fluid vessel 127 most likely has an advantage of lesser complexity, while adding and removing fluid 112 to and from the fluid vessel 127 most likely has an advantage of maintaining the deformation of the surface 115 without the need for additional energy (if valves or other lockable mechanisms are used). Although the cause of the deformation of a particular region 113 of the surface 115 has been described as a modification of the volume of the fluid in the fluid vessel 127, it is possible to describe the cause of the deformation as an increase or decrease in the pressure below the surface 115 relative to the pressure above the surface 115. When used with a mobile phone device, an increase of approximately 0.1-10.0 psi between the pressure below the layer 110 relative to the pressure above the layer no, is preferably enough to outwardly deform a particular region 113 of the surface 115. When used with this or other applications, however, the modification of the pressure may be increased (or possibly decreased) by any suitable amount.

The shape of the deformation of the particular region 113 is preferably one that is felt by a user through their finger and preferably acts as (1) a button that can be pressed by the user, (2) a slider that can be pressed by the user in one location along the slider or that can be swept in a sliding motion along the slider (such as the "click wheel" of the second generation Apple iPod), and/or (3) a pointing stick that can be pressed by the user from multiple directions and/or locations along the surface whereby the user is provided with tactile feedback that distinguishes a first directional touch from a second directional touch and/or a touch in a first location from a touch in a second location (such as the pointing stick trademarked by IBM as the TRACKPOINT and by Synaptics as the TOUCHSTYK (which are both informally known as the "nipple")). The deformation may, however, act as any other suitable device or method that provides suitable tactile guidance and feedback. In the variation including a display 150, the shape of the deformation of the particular region 113 also preferably functions to minimize the optical distortion of the image underneath the deformed particular region 113.

2. Retrieving a User Preference and Manipulating the Volume of Fluid

The user preference retrieved in Step S130 is preferably one of the following embodiments: a first embodiment for the operation of the tactile interface layer 100, a second embodiment for interaction between the device and the tactile interface layer, and a third embodiment for operation of the device. The step of retrieving a user preference S130 of the first embodiment preferably includes retrieving a user preference for the operation of the tactile interface layer Step S132 and the step of manipulating the volume of fluid to deform a particular region of the surface of the first embodiment S140 preferably includes manipulating the volume of fluid to deform a particular region of the surface based on the user preference for the operation of the tactile layer Step S142. The step of retrieving a user preference S130 of the second embodiment preferably includes retrieving a user preference for the interaction between the device 10 and the tactile interface layer Step S134 and the step of manipulating the volume of fluid to deform a particular region of the surface S140 of the second embodiment preferably includes manipulating the volume of fluid to deform a particular region on the surface based on the user preference for the interaction between the device 10 and the tactile interface layer Step S144. The step of retrieving a user preference S130 of the third embodiment preferably includes retrieving a user preference for the operation of the device Step S133. A user preference for the operation of the device may be a user preference for vibrating and/or producing a sound when a particular region 113 is deformed or when a particular application of the device is actuated. Alternatively, a user preference for the operation of the device may include a user preference for the loudness of the sound produced and/or the magnitude of the vibration produced. However, the user preference for the operation of the device may be any other suitable kind of preference for an application of the device.

2.1 User Preference of a First Embodiment

A user preference of the first embodiment may be one of several variations: (1) a preference for the geometry of the deformation (e.g., the size of the deformed particular region 113), (2) a preference for the tactile feel of the deformation (e.g., the firmness of the deformation), (3) a preference for the performance of the deformation (e.g., the deformation rate of the particular region 113 and/or the time that the particular region 113 is deformed), (4) a preference for the sensitivity of the sensor 140 (for example, sensitivity at the deformed particular region 113, sensitivity at the un-deformed particular region 113, or sensitivity for any other suitable state or location along the surface 115) or (5) a preference for the location of the particular region 113 relative to the tactile interface layer too. In the variation of the fluid vessel 127 that includes a second cavity 125b that corresponds to a second particular region 113, a sixth variation may include a preference for which of the particular region 113 and/or second particular region 113 to deform. In the variation of the tactile interface layer that includes a display 150, a seventh variation may include a preference for a tactilely distinguishable formation independent of the operation of the display 150. However, any other suitable user preference for the operation of the tactile interface layer may be retrieved through the user interface in Step S132.

The volume of fluid may be manipulated in one of several variations to deform a particular region of the surface based on the user preference for the operation of the tactile layer S142.

A first variation of manipulating the volume of fluid to deform a particular region of the surface based on the user preference for the operation of the tactile interface layer S142 preferably includes adjusting the operation of the displacement device 130 and is preferably applied to the first, second, and/or third variation of a user preference of the first embodiment. In particular, adjusting the operation of the displacement device 130 is preferably used to adjust the geometry, tactile feel, and performance of the deformation of the particular region 113. As mentioned above, the cause of the deformation of the particular region 113 may be thought of as an increase in the pressure below the surface 115 relative to the pressure above the surface 115. The displacement device 130 functions to provide this increase in pressure by modifying the volume of fluid 112 within the cavity 125. For example, the level of increase in the volume of fluid 112 within the cavity 125 directly influences the level of increase of the pressure below the surface 115, and by changing the level of increase in pressure below the surface 115 relative to the pressure above the surface 115, characteristics such as the firmness and the height of the deformation of the particular region 113 may be adjusted. The rate of increase of the pressure below the surface 115 relative to the pressure above the surface 115 may also affect the rate at which the deformation of the particular region 113 occurs. Similarly, the length of time that the displacement device 130 provides the increased pressure is directly related to the length of time that a particular region is deformed. By providing adjustments through varying the operation parameters of the displacement device 130 in this first variation, the number of available adjustment settings is directly related to the number of available variations in the operation parameters of the displacement device 130. For example, in adjusting the firmness of the deformation of the particular region 113, the tactile interface layer 100 may provide a minimum firmness and a maximum firmness with a substantially large number of firmness level settings in between the minimum and maximum firmness, each correlating with a volume increase within the cavity 125 that a displacement device 130 of the first variation may induce or a volume of fluid 112 that a displacement device 130 may provide. This may provide the user with the ability to apply an adjustment setting that is substantially close to their personal preference. The number of available settings may be less than the number of available variations in the operation parameters of the displacement device 130 to decrease complexity. However, any other suitable number of adjustment settings may be provided to the user.

Figure 6A:
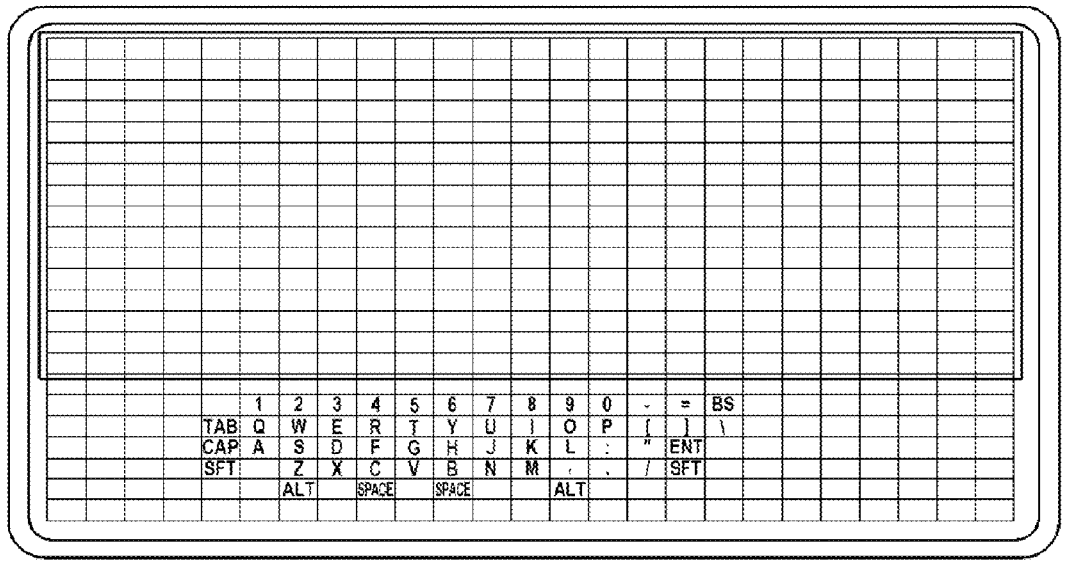
FIGS. 6a and 6b is a representation of a set of variations to the user interface system.
Figure 6B:
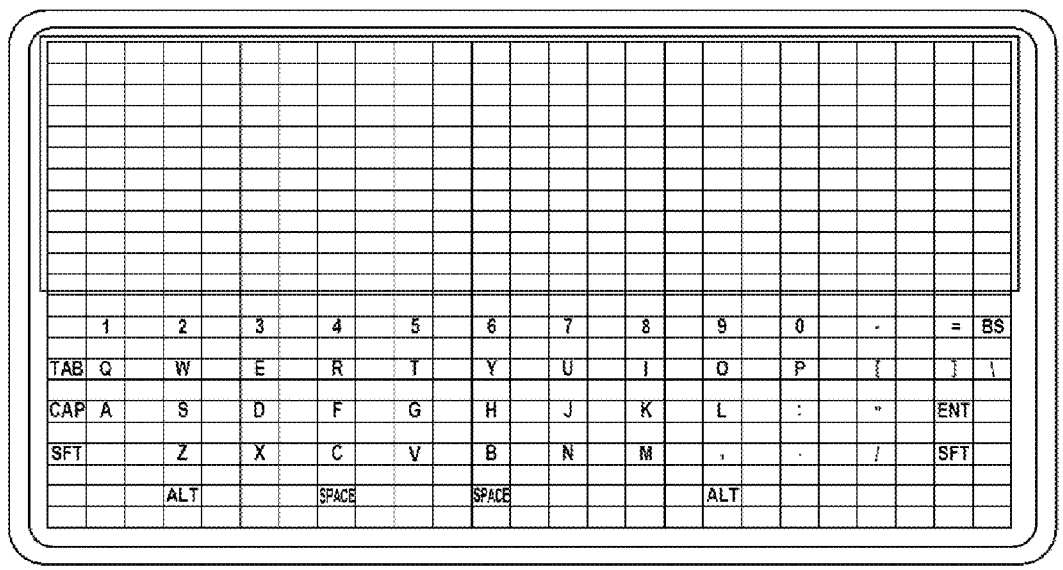

In another example of the first variation, adjusting the operation of the displacement device 130 may be applied to the fifth variation of the user preference of the first embodiment where the user provides a preference for the location of the particular region 113 relative to the tactile interface layer 100 and/or the sixth variation where there is a second cavity 125b and the user provides a preference for which of the particular region 113 and/or second particular region 113 to deform. In particular, the displacement device 130 may function to selectively expand the cavity 125 and/or the second cavity 125b corresponding to a particular region 113 that is indicated in the user preference. The user may select one particular region from a first and a second particular region that they desire to be expanded to provide tactile guidance in a certain user scenario. Alternatively, there may be a plurality of cavities 125 and second cavities 125b that are arranged into a first group and a second group. In an example of a user selection for a particular usage scenario, the first group may include a first spacing in between each particular region 113 of the first group and the second group may include a second spacing in between each particular region 113 of the second group, as shown in FIGS. 6a and 6b. A user may prefer the second spacing (for example, a larger spacing) and select to expand the second group during use. The displacement device 130 then functions to expand the second group for the particular usage scenario. Any other variations to the operation parameters of the displacement device 130 may be used to adjust the characteristics of the first embodiment of the tactile interface layer 100.

A second variation of manipulating the volume of fluid to deform a particular region of the surface based on the user preference for the operation of the tactile interface layer S142 preferably includes adjusting the deformation of the particular region 113 to set a user preference of the fourth variation for the sensitivity of the sensor 140. For example, the sensor 140 may be a capacitive sensor that detects the presence of the finger of the user at a distance away from the surface 115. To decrease the sensitivity of the sensor 140, the height of the deformation of the particular region 113 may be increased such that, when the finger of the user is resting on the top of the deformed particular region 113, a user input is not registered. In other words, the equivalent sensitivity of the sensor may be decreased while the actual sensitivity of the sensor remains the same. Alternatively, the sensitivity of the sensor 140 may be adjusted by adjusting the operation of the sensor 140. In one example, the thresholds for the sensor 140 to register a user input may be adjusted. In the variation wherein the sensor 140 is a touch sensitive display, a touch at any location along the display may register as a user input regardless of the presence of a particular region 113, preventing the user from resting their finger on a deformed particular region 113 as a user would normally be able to do on a static tactile interface such as those found on a remote control with mechanical buttons or a Blackberry mobile phone. In this variation, the user may input a user preference for a lower sensitivity for the sensor 140 wherein a user input is registered only if the finger is at a certain distance away from the touch sensitive display, preferably one wherein the distance is less than the distance between the most distant point of the deformation of the particular region 113 from the surface 115, allowing the user to rest their finger on the deformation and the sensor 140 only registering a user input when the deformation is inwardly deformed by force applied by the user. In the variation wherein the sensor 140 is a capacitive or a pressure sensor, the sensitivity of the sensor 140 may be adjusted such that a user input is registered with a certain degree of change in capacitive or pressure reading. However, any other suitable adjustment to the sensitivity of the sensor 140 may be provided to the user.

In another example of adjusting the operation of the sensor 140, readings from the sensor 140 may be ignored and/or the sensor 140 may be disabled. In the variation wherein the sensor 140 is a touch sensitive display, certain portions of the touch sensitive display may be disabled and/or readings from certain portions of the touch sensitive display may be ignored. For example, for certain usage scenarios, the particular region 113 that is deformed may be on a first portion of the touch sensitive display. The user may input a user preference to disable the remaining portions of the touch sensitive display to prevent undesired touch inputs, but may alternatively allow the remaining portions of the touch sensitive display to continue to receive touch inputs, allowing the user to select options that are displayed in a location wherein the particular region 113 is not deformed. However, any other suitable combination of ignored readings, disabled sensing, and/or enabled sensing may be used.

A third variation of manipulating the volume of fluid to deform a particular region of the surface based on the user preference for the operation of the tactile interface layer S142 preferably includes manipulating the volume of fluid to deform a particular region of the surface independently of the state of the display 140 and is preferably applied to the seventh variation of a user preference of the first embodiment to set a user preference for a tactilely distinguishable formation independent of the operation of the display 150. For example, the user preference may include disabling the display 150 while enabling the sensor 140. Subsequently, the volume of fluid is manipulated to expand a particular region of the surface. Because the tactile interface layer 100 provides tactile guidance, the visual guidance provided by the display 150 is not necessary in certain scenarios to guide the user in the user of the device 10. Disabling the display 150 allows the device 10 to conserve energy, potentially extending the use time per charge of the device 10 if the device 10 is a portable device such as a camera or a cellular phone.

The user preferences for the operation of the tactile interface layer 100 retrieved in Step S132 are preferably one of the variations as described above but may alternatively be any other suitable combination of or any other kind of user preference for the operation of the tactile interface layer 100. The volume of fluid is preferably manipulated in Step S142 using a system or method described above, but may alternatively be a combination of the systems and/or methods described above or any other suitable system or method.

2.2 User Preference of a Second Embodiment

A user preference for the interaction between the device and the tactile interface layer retrieved in Step S132 may also be of one of several variations. In a first variation, the user preference of the second embodiment may be a preference for the location of the particular region 113 relative to the device 10. For example, the user may indicate the location of the particular region 113 relative to the device 10 that best fits the size of his or her hand. In a second variation, the tactile interface layer 100 may include a second cavity 125b that corresponds to a second particular region 113, and the user preference of the second embodiment may be a preference for the location of a particular region 113 relative to another particular region 113. For example, the displacement device 130 may manipulate fluid to deform a plurality of particular regions 113 into tactilely distinguishable formations that cooperatively represent a keyboard layout and the user preference may be a preference for the relative location between the keys of the keyboard, as shown in FIGS. 6a and 6b. By allowing the user to provide a preference for the relative location between the keys of the keyboard the tactile interface layer 100 is substantially customized to each individual user, which may increase the usability of the keyboard and may potentially decrease the risk of repetitive stress syndrome.

A third variation of a user preference of the second embodiment may include a preference for the timing for the actuation of a deformation. As an example, the user preference may include the preference for actuation of a deformation when a particular application of the device is actuated. The tactile interface layer 100 may define a plurality of particular regions 113 that cooperatively represent a numeric keypad and device 10 may include a phone application and the user preference may be to actuate the deformation of the plurality of particular regions 113 when the phone application is actuated. In another example, the displacement device 130 may manipulate fluid to deform a plurality of particular regions 113 into tactilely distinguishable formations that cooperatively represent a QWERTY keyboard and the device 10 may include a typing application and the user preference may be to actuate the expansion of the QWERTY keyboard when the user initiates a typing application. In yet another example, the displacement device 130 may manipulate fluid to deform a plurality of particular regions 113 into tactilely distinguishable formations and the user preference may include a preference for the actuation of the deformation of a particular tactilely distinguishable formation at a particular timing. The plurality tactilely distinguishable formations cooperatively represent a keyboard and the user preference preferably includes a preference for a tactilely distinguishable region representing a particular key.

The user preference for interaction between the device 10 and the tactile interface layer 100 retrieved in Step S134 is preferably one of the variations as described above but may alternatively be any other suitable combination of or any other kind of user preference for the operation of the device 10 and/or interaction between the device 10 and the tactile interface layer 100.

The volume of fluid is preferably manipulated in Step S144 using a system or method described above for the step of manipulating the volume of fluid to deform a particular region of the surface Step S142, but may alternatively be a combination of the systems and/or methods described above or any other suitable system or method. The manipulation of the fluid is preferably actuated by a processing unit of the device 10, for example, actuating the expansion of the desired cavity 125 during certain usage scenarios such as incoming phone calls on a phone. However, any other suitable interaction between the device 10 and the tactile interface layer 100 may be used.

3. Providing a User Interface

As described above, the user interface provided in Step S110 to retrieve a user input may be provided on the tactile interface layer 100, which may allow the user to have a direct tactile comparison between different available settings for the tactile interface layer 100; on both the device 10 and the tactile interface layer 100, which may allow the device 10 and the tactile interface layer 100 to cooperatively provide a user interface for the user; on the device 10; or in any other suitable arrangement. The device 10 and/or the tactile interface layer 100 preferably enters a "customization mode" wherein the user is prompted to provide inputs for user preferences that preferably do not register as any other kind of input. The user interface tactile, visual, audible, or in any other suitable kind of media.

In a first variation of the user interface, the interface is provided on the tactile interface layer 100. In a first example of the user interface of the first variation, the user interface may provide a plurality of expanded cavities 125 and/or 125I3 that result in a plurality of deformed particular regions 113 on the tactile interface layer 100, wherein each of the plurality of deformed particular regions 113 is of a different characteristic such as a different degree of firmness and/or a different shape. The user then selects the particular region 113 that best fits their preferences and the selection is detected by the sensor 140 and sent to a processing unit in the tactile interface layer 100 and/or a processing unit in the device 10.

In a second example of the first variation, the user interface may provide a deformed particular region 113 in the form of a slider on the tactile interface layer 100. The slider may include a plurality of regions, each region representing a different degree of a characteristic such as firmness, size, and/or distance between deformations. The user may slide their finger along the slider to experience the various degrees of the characteristic and select the desired degree. The selection may be inputted by providing force at the location along the slider of the degree they select, but may alternatively be a selection inputted adjacent to the slider or any other suitable location or kind of input.

In a third example of the first variation, the user interface may provide a deformed particular region 113 in the form of a slider and another particular region 113 in the form of an "example region" on the tactile interface layer 100. The user may adjust the position of the slider to adjust the option for adjustment demonstrated by the "example region." The user may tactilely feel the example region as they adjust the slider and then select their desired adjustment. The slider is preferably of a uniform characteristic to decrease the tactile variations felt by the user and to potentially decrease confusion, but may alternatively emulate the adjustment demonstrated by the example region to allow the user to tactilely feel the adjusted characteristic on more than one location or shape of deformed particular region.

In a fourth example of the first variation, the user interface may provide a deformed particular region 113 that transitions in between different degrees of a characteristic such as firmness, or size and the user selects the desired degree. The transitions are preferably cyclic and repeat the range of degrees for the user to experience as many times as necessary before making a selection. The user may input the selection as the deformed particular region 113 is demonstrating the various available options, but may alternatively input the selection after the deformed particular region 113 has demonstrated the available options. The rate of demonstration by the deformed particular region 113 is preferably at a slow rate to allow the user to adequately examine the option for their decision, but may alternatively be an adjustable rate or any other suitable rate.

In a fifth example of the first variation, the user interface may provide a plurality of cavities 125 that may correspond to, for example, a keyboard layout. A plurality of cavities 125 is expanded and a plurality of deformed particular regions of the surface 113 is presented to the user. The user may then select the set of deformed particular regions of the surface 113 that best fit their hand shape for a particular application as described in the second variation of a user preference of the second embodiment retrieved in Step S134 and as shown in FIGS. 4a and 4b. In the example of a keyboard layout, the user may select the set of deformed particular regions that best match their hand size and shape, allowing for a more personalized keyboard layout for each individual user, potentially decreasing the risk of repetitive stress disorder that may result from arranging the hand of the user in an uncomfortable and stressful position. In the example of the keyboard layout, the user may be presented with a plurality of options for the location of the deformed particular region that corresponds to each keyboard key. The options for the location of each key may be presented concurrently with the options for every other key in the keyboard, but may alternatively be presented to the user one after the other. However, any other suitable method to allow the user to select their desired location of each key may be used. Once the location of each key is determined, the user may then be prompted to select the desired height and/or firmness of each key, allowing the user interface system to accommodate to the natural angle of the user's hands, further decreasing the potential of repetitive stress syndrome.

Figure 7:
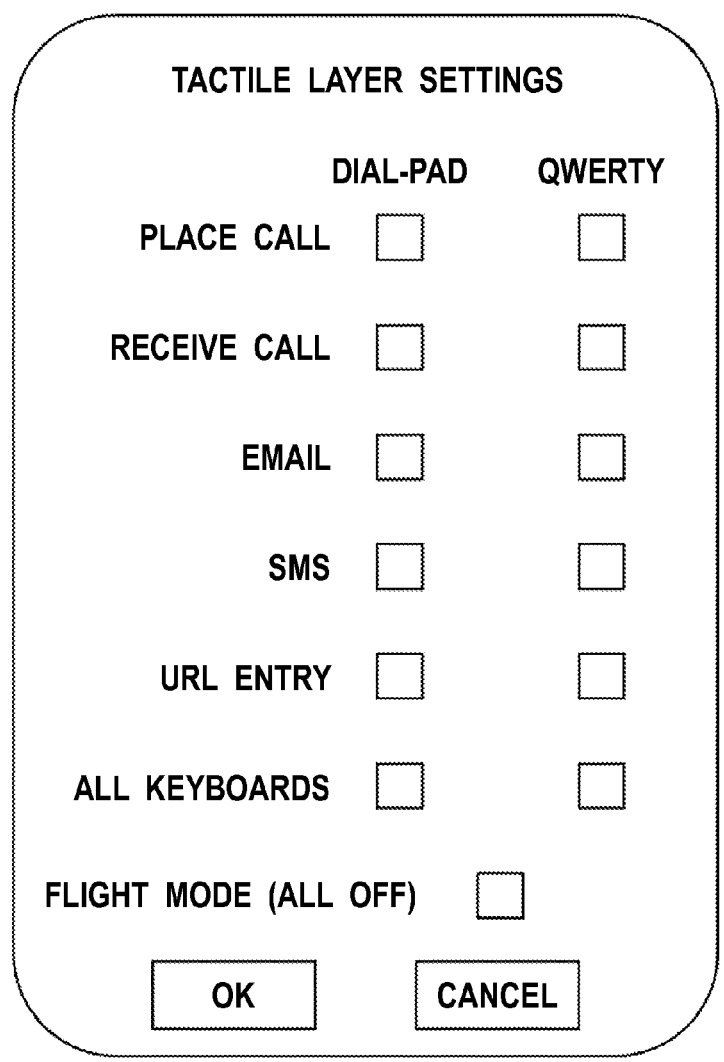
FIGS. 7-9 are examples of input interfaces provided to the user on the device.

In a second variation of the user interface, the user interface is provided on the device 10. This variation is particularly applicable in retrieving a user preference for the interaction of the device and the tactile interface layer S134. The user interface as provide on the device 10 is preferably applied to a device 10 that includes a display 150 that provides an image to communicate to the user, but may alternatively be applied to any other suitable kind of device, for example, a device that includes a speaker to communicate with the user, or a device that provides a vibration to communicate with the user. In a first example of the second variation of the user interface, as shown in FIG. 7, the user interface may provide a series of check boxes where the user may choose options for the actuation of the deformation of the particular region 113 (such as to retrieve a user preference for the actuation of a deformation in the third variation of the user preference of the second embodiment). As shown in FIG. 7, the user may select to actuate the deformation of the particular region 113 when the "place call," "receive call," "email," etc, application of the device 10 is actuated. Additionally, the user may provide a preference for the arrangement of the particular region 113 that is to be deformed, for example, a QWERTY keyboard or a numeric keypad.

Figure 8:
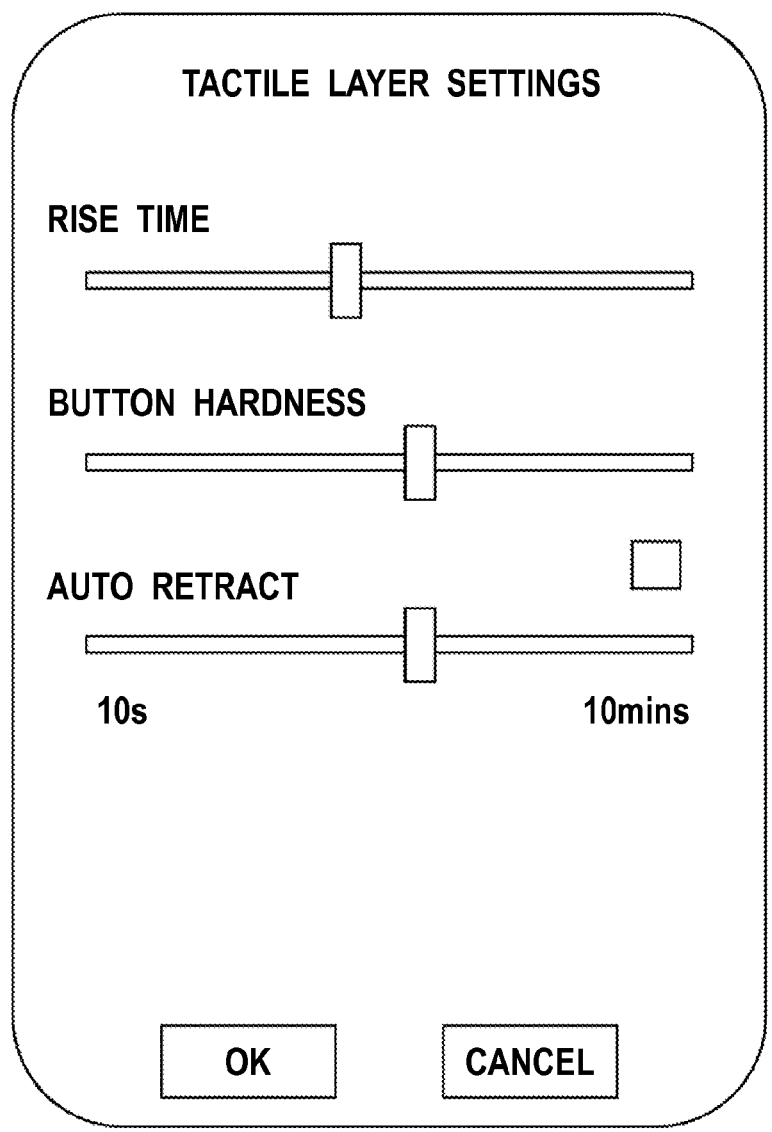

In a second example of the second variation, as shown in FIG. 8, the user interface may provide an interface on the device 10 that allows the user to provide a preference for the operation of the tactile interface layer 100. In other words, a user interface to retrieve a user preference for the operation of the tactile layer 100 (the first embodiment of user preference) may be provided on the device 10. This example of the second variation of the user interface may function similarly to the second and third example of the user interface of the first variation that provide a slider on the tactile interface layer 100.

Figure 9:
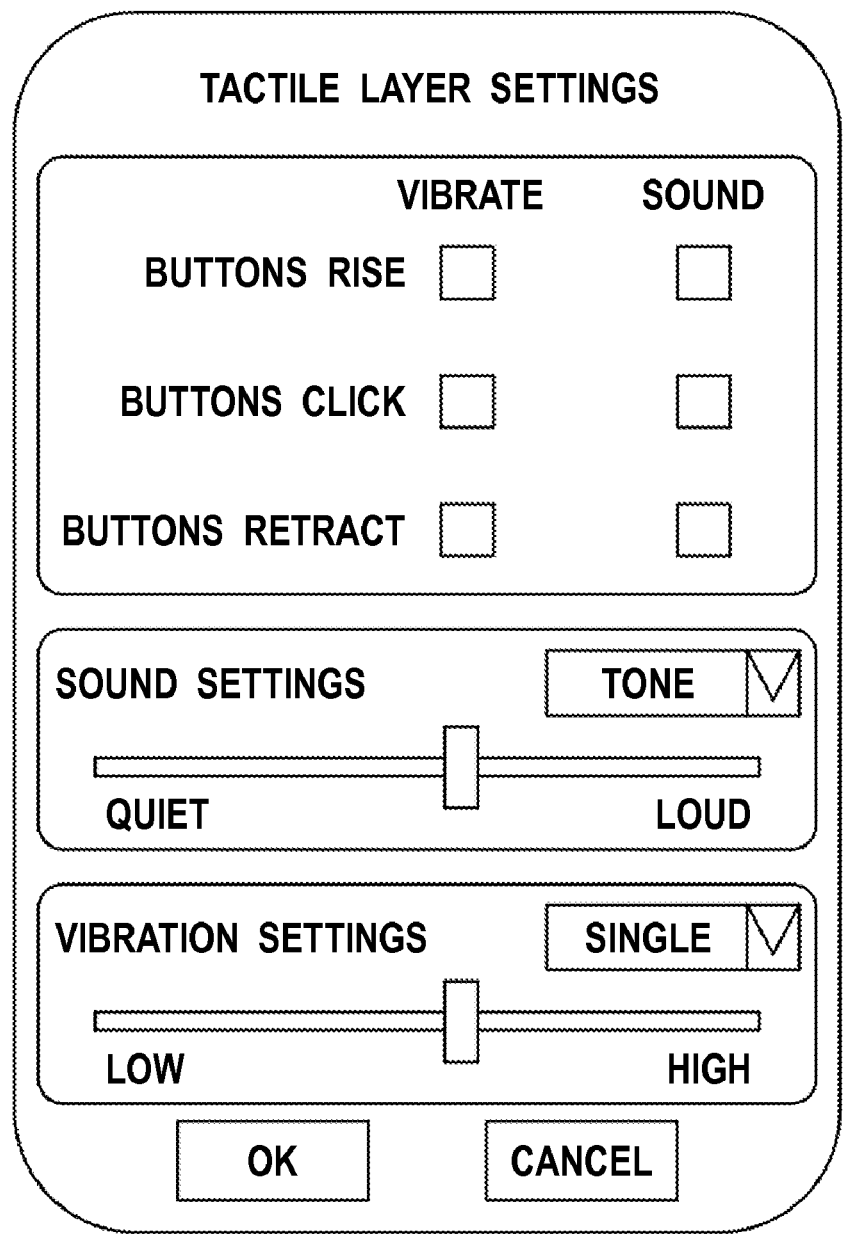

In a third example of the second variation, as shown in FIG. 9, the user interface may provide an interface on the device 10 that allows the user to provide a preference for the operation of the device, for example, vibrating and/or producing a sound when a particular region 113 is deformed or when a particular application of the device is actuated. This is particularly applicable to retrieving a user preference for the operation of the device in Step S133.

In a fourth example of the second variation, the user interface may allow the user to select the desired location for a particular region. For example, in the variation where the device 10 includes an application which uses a keyboard, the user interface may prompt the user to select the desired location for each key in a keyboard instead of providing options to the user for the location of each key in the keyboard. The user may alternatively be asked to place the fingers of their hand in the most natural position onto the tactile interface layer 100. The location of each finger is detected and the cavity 125 and particular region of the surface 113 that is substantially adjacent to the location of the finger is then selected as the location of the keyboard key.

In a third variation of the user interface, the user interface may be is provided on a device that is external to both the device 10 and the tactile interface layer 100. For example, the user interface may be provided an application on the Internet, on a personal computer, or any other suitable medium.

The user interface of the preferred embodiments is preferably one of the variations described above, but may alternatively be a combination of the variations described above. For example, the user interface may provide a slider on the device 10 that functions to control the characteristic of an "example region" on the tactile interface layer 100, allowing the device 10 and the tactile interface layer 100 to cooperatively provide a user interface to the user. The device may also provide a visual indicator (for example, a numerical level setting) that indicates the level of a particular setting. This may facilitate in communicating setting options to the user. However, any other suitable user interface may be used.

As shown in FIGS. 1 and 2, a processing unit retrieves a user preference that is provided by the user on the user interface S130 and sets the user preferences to the operating conditions S140. The processing unit may actuate the manipulation of the volume of fluid based on the user preferences to the operation of the tactile interface layer S132, the operation of the device S133, and/or the interaction between the device and the tactile interface layer S134. In a first variation, the processing unit may be included into the tactile interface layer 100 and may also function to control the displacement device 130, sensor 140 and/or the display 150. The processing unit may communicate directly with the components of the tactile interface layer 100 (e.g. the displacement device 130), but may alternatively communicate with the components of the tactile interface layer 100 in any other suitable manner. The processing unit of this first variation may function to communicate with a processing unit of the device 10 to receive signals representing user selections.

In a second variation, the processing unit may be included into the device 10 and may also function to control the applications of the device 10. The processing unit of this second variation may communicate directly with the components of the tactile interface layer 100 (e.g. the displacement device 130), but may alternatively communicate to the components of the tactile interface layer 100 in any other suitable manner. The processing unit of this second variation may communicate with the components of the tactile interface layer 100 through a wired communication protocol, a wireless communication protocol, or any other suitable kind of communication protocol.

In a third variation, the processing unit may be external to both the tactile interface layer 100 and the device 10, for example, a personal computer that is communicably coupled to the tactile interface layer 100 and/or the device 10. In this variation, when the user desires to provide and/or apply user preferences to operating conditions, the device and/or the tactile layer 100 may be connected to a personal computer that may include an interface that allows the user to provide a user preference.

The processing unit of the preferred embodiments is preferably one of the variations as described above, but may alternatively be any combination of the above variations. For example, the tactile interface layer 100 may include a processing unit that functions to control the tactile interface layer 100 and the device 10 may include a processing unit that functions to control the device 10. The processing units of the tactile interface layer 100 and the device 10 may function to communicate with each other to provide control for an operating condition. In this variation, the processing unit of the tactile interface layer 100 may communicate with the processing unit of the device 10 through a wired communication protocol, a wireless communication protocol, or any other suitable kind of communication protocol. However, any other suitable arrangement of the processing unit may be used.

As a person skilled in the art will recognize from the previous detailed description and from the figures and claims, modifications and changes can be made to the preferred embodiments of the invention without departing from the scope of this invention defined in the following claims.

We claim:

1. A method, for adjusting a user interface of a device, comprising:
   providing a user interface including a tactile guidance arranged proximal a location configured to accept a user input, the tactile guidance comprising:
      a volume of fluid;
      a tactile layer defining an outer tactile surface touchable by a user, defining a back surface opposite the tactile surface, and including plurality of first regions and a plurality of second regions, wherein each second region is of an elastic material and is operable between:
         a retracted state, wherein the second region is flush with the first regions; and
         an expanded state, wherein the second region is proud of the first regions;
      a substrate joined to a portion of the back surfaces of the first regions and retaining the first regions in planar form;
      the substrate defining support surfaces that are adjacent to the second regions, are disconnected from the second regions, are in contact with the second regions in the retracted state, and prevent deformation of the second regions inward past the plane of the first regions due to a force applied to the tactile surface by the user;
      the substrate further defining fluid ports that communicate a portion of the fluid, through a portion of the substrate, to the back surfaces of the second regions; and
      a displacement device configured to manipulate a portion of the fluid, through a portion of the fluid ports, toward the back surfaces of the second regions to transition a portion of the second regions from the retracted state to the expanded state;
   retrieving a user preference for either of a first characteristic and a second characteristic of the tactile guidance proximal the location; and
   manipulating a portion of the fluid to transition the tactile guidance to either of the first characteristic and the second characteristic based upon the user preference.

2. The method of claim 1, wherein retrieving the user preference includes receiving the user preference through the user interface.

3. The method of claim 2, further comprising interpreting a user force on the tactile surface as indicative of the user preference.

4. The method of claim 1, wherein, in the expanded state, a second region defines a button that is a substantially dome-shaped protrusion.

5. The method of claim 1, wherein the substrate further defines a fluid vessel communicating a portion of the fluid between the displacement device and a fluid port.

6. The method of claim 5, wherein the fluid vessel includes a cavity that contains a portion of the fluid.

7. The method of claim 1, wherein the plurality of second regions cooperatively represent a keyboard.

8. The method of claim 7, wherein the keyboard is of a type selected from the group consisting of a text keyboard and a numeric keypad.

9. The method of claim 1, wherein-manipulating the fluid to transition a portion of the second regions includes:
   expanding a first selection of the plurality of second regions, from the retracted state to the expanded state, for the first characteristic; and
   expanding a second selection of the plurality of second regions, different than the first selection, from the retracted state to the expanded state, for the second characteristic.

10. The method of claim 1, wherein manipulating the fluid to transition a portion of the second regions includes:
    deforming a second region, in the expanded state, to a first height for the first characteristic; and
    deforming a second region, in the expanded state, to a second height, different than the first height, for the second characteristic.

11. The method of claim 10, wherein manipulating the fluid to transition a portion of the second region includes manipulating the fluid pressure within the fluid ports to adjust the height of the portion of the second regions in the expanded state.

12. The method of claim 1, wherein manipulating the fluid to transition a portion of the second region includes:

adjusting the firmness of a second region, in the expanded state, to a first firmness for the first characteristic; and adjusting the firmness of a second region, in the expanded state, to a second firmness, different than the first firmness, for the second characteristic.

13. The method of claim 12, wherein manipulating the fluid to transition a portion of the second region includes manipulating the fluid pressure within the fluid ports to adjust the firmness of the portion of the second regions in the expanded state.

14. The method of claim 1, wherein manipulating the fluid to transition a portion of the second region includes:

transitioning a second region, from the retracted state to the expanded state, at a first rate for the first characteristic; and transitioning a second region, from the retracted state to the expanded state, at a second rate, different than the first rate, for the second characteristic.

15. The method of claim 1, wherein manipulating the fluid to transition a portion of the second region includes:

maintaining a second region in the expanded state for a first duration of time for the first characteristic; and maintaining a second region in the expanded state for a second duration of time, different than the first duration of time, for the second characteristic.

16. The method of claim 1, wherein manipulating the fluid to transition a portion of the second region includes:

transitioning a second region, from the retracted state to the expanded state, after a first time duration, following an event, for the first characteristic; and transitioning a second region, from the retracted state to the expanded state, after a second time duration, different than the first time duration, following the event, for the second characteristic.

17. The method of claim 1, wherein providing the user interface includes providing a sensor configured to detect a user touch on the tactile surface proximal to the second regions.

18. The method of claim 17, wherein the sensor is a capacitive touch sensor.

19. The method of claim 17, wherein the sensor is a pressure sensor that detects a pressure change in a portion of the fluid, wherein the pressure change is indicative of a user touch on the tactile surface.

20. The method of claim 17, further comprising:

receiving a user selection for either of a first sensitivity and a second sensitivity to a user touch on the tactile surface proximal to a second region; and adjusting the sensitivity of the sensor to either of the first and the second sensitivities based upon the user selection.

21. The method of claim 1, wherein the device is an electronic device selected from the group consisting of: an automotive console; a desktop computer; a laptop computer; a tablet computer; a television; a radio; a desk phone; a mobile phone; a PDA; a personal navigation device; a personal media player; a camera; a gaming console; a gaming controller; a remote control; and a watch.

22. The method of claim 1, further comprising:

receiving a user selection for either of a first action and a second action of the device; and adjusting an action of the device to either of the first action and the second action based upon the user selection.

23. The method of claim 22, wherein the first action is a feedback mechanism at a first intensity and the second action is the feedback mechanism at a second intensity.

24. The method of claim 22, wherein the first and second actions are selected from the group of vibratory feedback, audible feedback, and visual feedback.

25. A method, for adjusting the user interface of a device, comprising:

providing a user interface including a tactile guidance arranged proximal a location configured to accept a user input, the tactile guidance comprising:

a volume of fluid;

a tactile layer defining an outer tactile surface touchable by a user, defining a back surface opposite the tactile surface, and including a plurality of first regions and a plurality of second regions, wherein each second region is of an elastic material and is operable between:

a retracted state, wherein the second region is flush with the first regions; and an expanded state, wherein the second region is proud of the first regions;

a substrate joined to a portion of the back surfaces of the first regions and retaining the first regions in planar form;

the substrate defining support surfaces that are adjacent to the second region, are disconnected from the second region, are in contact with the second region in the retracted state, and prevent deformation of the second regions inward past the plane of the first regions due to a force applied to the tactile surface by the user;

the substrate further defining fluid ports that communicate a portion of the fluid, through a portion of the substrate, to the back surfaces of the second regions;

a displacement device configured to manipulate a portion of the fluid, through a portion of the fluid ports, toward the back surfaces of the second regions to transition a portion of the second regions from the retracted state to the expanded state; and a sensor configured to detect a user touch on the tactile surface proximal to the location;

retrieving a user preference for either of a first characteristic and a second characteristic of the tactile guidance proximal the location; and manipulating a portion of the fluid to transition the tactile guidance to either of the first characteristic and the second characteristic based upon the user preference.

26. The method of claim 25, wherein the sensor is a capacitive touch sensor.

27. The method of claim 25, wherein the sensor is a pressure sensor that detects a pressure change in a portion of the fluid, wherein the pressure change is indicative of a user touch on the tactile surface.

28. The method of claim 25, further comprising:

ignoring a force, of a given magnitude, applied to the tactile surface at a second region by the user, when at the first sensitivity; and interpreting a force, of the given magnitude, applied to the tactile surface at a second region by the user, as an input when at the second sensitivity.

* * * * *